US008478231B2

(12) United States Patent
Black et al.

(10) Patent No.: US 8,478,231 B2
(45) Date of Patent: Jul. 2, 2013

(54) METHOD AND DEVICE FOR UPDATING A PREPAID BALANCE

(75) Inventors: Gregory R. Black, Vernon Hills, IL (US); Rafael Colorado, Long Grove, IL (US); Manoj Puchadath Raghavan, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1377 days.

(21) Appl. No.: 11/415,340

(22) Filed: May 1, 2006

(65) Prior Publication Data

US 2007/0254629 A1    Nov. 1, 2007

(51) Int. Cl.
*H04M 11/00*    (2006.01)
(52) U.S. Cl.
USPC ...... 455/406; 455/405; 455/432.1; 455/432.3
(58) Field of Classification Search
USPC .............................. 455/405, 406, 432.1, 432.3
See application file for complete search history.

(56) References Cited

U.S. PATENT DOCUMENTS

| | | | |
|---|---|---|---|
| 6,408,174 B1* | 6/2002 | Steijer | 455/407 |
| 6,496,690 B1* | 12/2002 | Cobo et al. | 455/408 |
| 6,654,599 B1 | 11/2003 | Lundstrom et al. | |
| 6,741,687 B1* | 5/2004 | Coppage | 379/114.2 |
| 7,043,229 B2* | 5/2006 | Hazlewood | 455/406 |
| 7,239,862 B1* | 7/2007 | Clare et al. | 455/406 |
| 7,599,887 B1* | 10/2009 | Short | 705/41 |
| 2001/0009849 A1* | 7/2001 | Hanson | 455/408 |
| 2004/0023636 A1* | 2/2004 | Gurel | 455/405 |
| 2004/0198316 A1* | 10/2004 | Johnson | 455/406 |

FOREIGN PATENT DOCUMENTS

EP    0 981 211 A1    2/2000

OTHER PUBLICATIONS

"Real time" Tariff information—The Feasibility of Implementation, GSM Europe The European interest group of the GSM Association, http://gsmeurope.gsmworld.com, Oct. 23, 2001, 11 pages.

* cited by examiner

*Primary Examiner* — Rafael Pérez-Gutiérrez
*Assistant Examiner* — Liton Miah (57) ABSTRACT

Disclosed is a method of a mobile communication device, a device and a method of a server for updating the prepaid balance during the active mode of the mobile communication device. The method of the device includes storing in memory a stored prepaid balance prior to initiating a wireless communication via a service provider, initiating an active mode wireless communication and transmitting, during the active mode wireless communication, at least one balance query to the service provider. The method further provides receiving, during the active mode wireless communication, a response to the balance query, determining if the response to the balance query is valid and processing the response to the balance query to obtain a new prepaid balance if the response to the balance query is valid.

10 Claims, 5 Drawing Sheets

METHOD AND DEVICE FOR UPDATING A PREPAID BALANCE

FIELD OF THE INVENTION

Disclosed is a method of a mobile communication device, a device and a method of a server for updating the prepaid balance during the active mode of the mobile communication device, and more particularly transmitting a balance query to the server and receiving from the server a balance response while the device is in active mode, and providing an indication of the balance amount to the user of the mobile device.

BACKGROUND

A purchaser of a mobile communication device has many options as to how to pay for air time. One manner in which to pay for time is to sign up for a calling plan. In particular, a purchaser can choose a calling plan with a service provider that gives the user an allotment of minutes per month for a certain price. Any overages are billed to the customer. To purchase such plans, a service provider may run a credit check on the purchaser, or require their possession of a valid credit card.

Instead of purchasing a plan, an airtime customer may prefer to purchase a prepaid block of airtime. Accordingly, the customer will have a finite amount of time in a prepaid block of airtime. Once the prepaid block is consumed, the customer must purchase a new block of airtime.

As the prepaid airtime subscriber uses the communication device during active mode, the balance of remaining available airtime diminishes from the initial prepaid subscription. Unless the user has kept track of the minutes used, and knows the tariff or roaming charges, the user must rely on the service provider to inform him of the remaining balance. To learn the remaining balance of a prepaid subscription, a balance query is initiated by the user while the mobile communication device is in idle mode. The service provider's prepay server telephone number may be five digits that must be input on the mobile device's key pad. In response, the service provider may thereafter provide the remaining prepaid balance either by SMS or an automated voice communication. It would be beneficial if the user could learn the remaining prepaid balance without having to place a call to the service provider. Additionally, it would be beneficial if the user could learn the remaining prepaid balance while engaged in wireless communication in active mode.

DETAILED DESCRIPTION

Described are a method of a mobile communication device, a method of a server, and a communication device for providing an updated prepaid balance value to a user during active mode wireless communication such as during a cellular telephone call. The method of a mobile communication device can include storing in memory a stored prepaid balance in idle mode, or prior to initiating active mode wireless communication via a service provider. The method may then also include initiating or receiving an active mode wireless communication by the mobile communication device. While initiating, receiving or otherwise engaging in a wireless communication the communication device is in an active mode. It is understood that active modes include outgoing communication transmission and incoming communication reception as in the case of a cellular telephone call, outgoing transmission, or incoming reception as in the case of broadcast or custom content reception. The device can be in active mode during, for example, a voice call or a temporary block flow. In idle mode the mobile communication device may also transmit and receive for the purpose of maintaining service availability with the network, whereas in active mode the mobile communication device communicates with a third party via the network.

During the communication, the mobile communication device can transmit at least one balance query to the service provider over an auxiliary communication channel. The balance query transmission during an active mode can be automatic or manually initiated. If a valid response to the balance query is received by the mobile communication device, the dynamically determined balance data of the response can be displayed on its display device. A method of determining validity can be to check that the balance has changed from the initial balance. On the other hand, if a valid balance query response is not received, a calculation can be made based on the stored prepaid balance that was stored before the communication was initiated. The calculated value can be displayed on the device's display. Accordingly, a user may learn during communication, an updated prepaid balance.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

Figure 1:
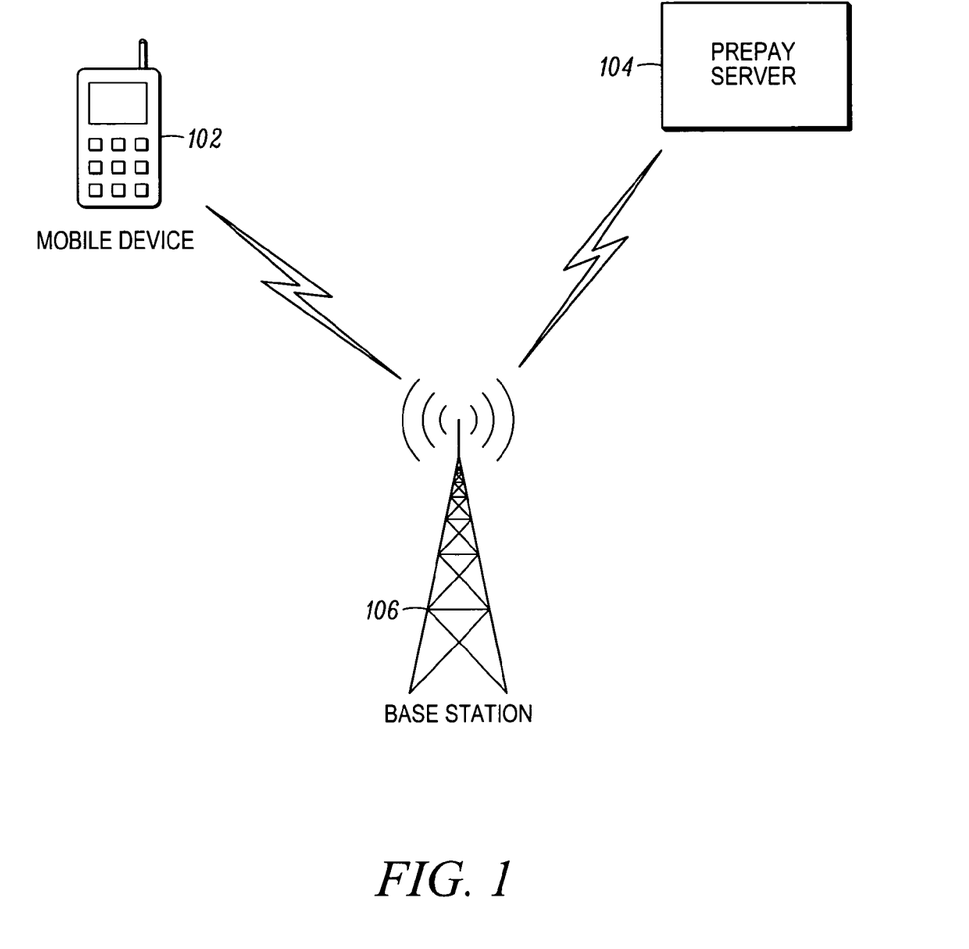
FIG. 1 depicts an overall system view including a mobile station, a base station and a prepay server.

FIG. 1 depicts an overall system view including a mobile communication device, a base station and a prepay server. A mobile communication device may be for example, a cellular telephone 102. The mobile communication device represents a wide variety of devices that have been developed for use within various networks. Such handheld communication devices can include, for example, cellular telephones, messaging devices, mobile telephones, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring high content data, SMS messaging, Internet access, multi-media content access and/or voice over internet protocol (VoIP).

The mobile communication device 102 can be in communication with a prepay server 104 via a base station controller 106. While FIG. 1 depicts a typical network arrangement, it is understood that any type of network is within the scope of this discussion. The mobile communication device 102 may be, for example, in communication in a WIFI network or an ad hoc network.

The prepay server 104 may be affiliated with a service provider or otherwise. The term "prepay server" can mean any entity that can receive from a mobile communication device 102, directly or indirectly, a prepaid balance query sent while the mobile communication device is engaged in active mode wireless communication. Moreover, the entity, affiliated entity or otherwise can respond to the query of the mobile communication device by transmitting a response including a prepaid balance value that is current when the response is transmitted.

It may be further useful or, useful in the alternative, for a user of the mobile device to know the tariff rate of an active mode wireless communication in progress, especially if the communication is outside the service provider's area, and there are roaming fees associated with it. The prepay server 104 or another entity may receive from the mobile communication device a tariff value query sent while the mobile communication device is engaged in active mode wireless communication. The entity or affiliated entity can respond to the tariff value query by transmitting a response including a tariff value that is current when the response is transmitted.

When transmitted by the prepay server 104, the received tariff value may be more accurate than a calculated tariff value. However, a calculated tariff value may also be beneficial and may be substantially accurate. A tariff value calculated by the mobile device may be based on the prepaid balance stored before the communication commenced, the duration of the active mode wireless communication and the received prepaid balance value described immediately above.

The calculation may be repeated. For example, in the event that a user is roaming, it may be beneficial to repeat the calculation based on the initial or a previously received prepaid balance or tariff value, the duration of the active mode wireless communication therefrom, and the most recently received prepaid balance value. In this way, the displayed balance or tariff value may be the most current.

Figure 2:
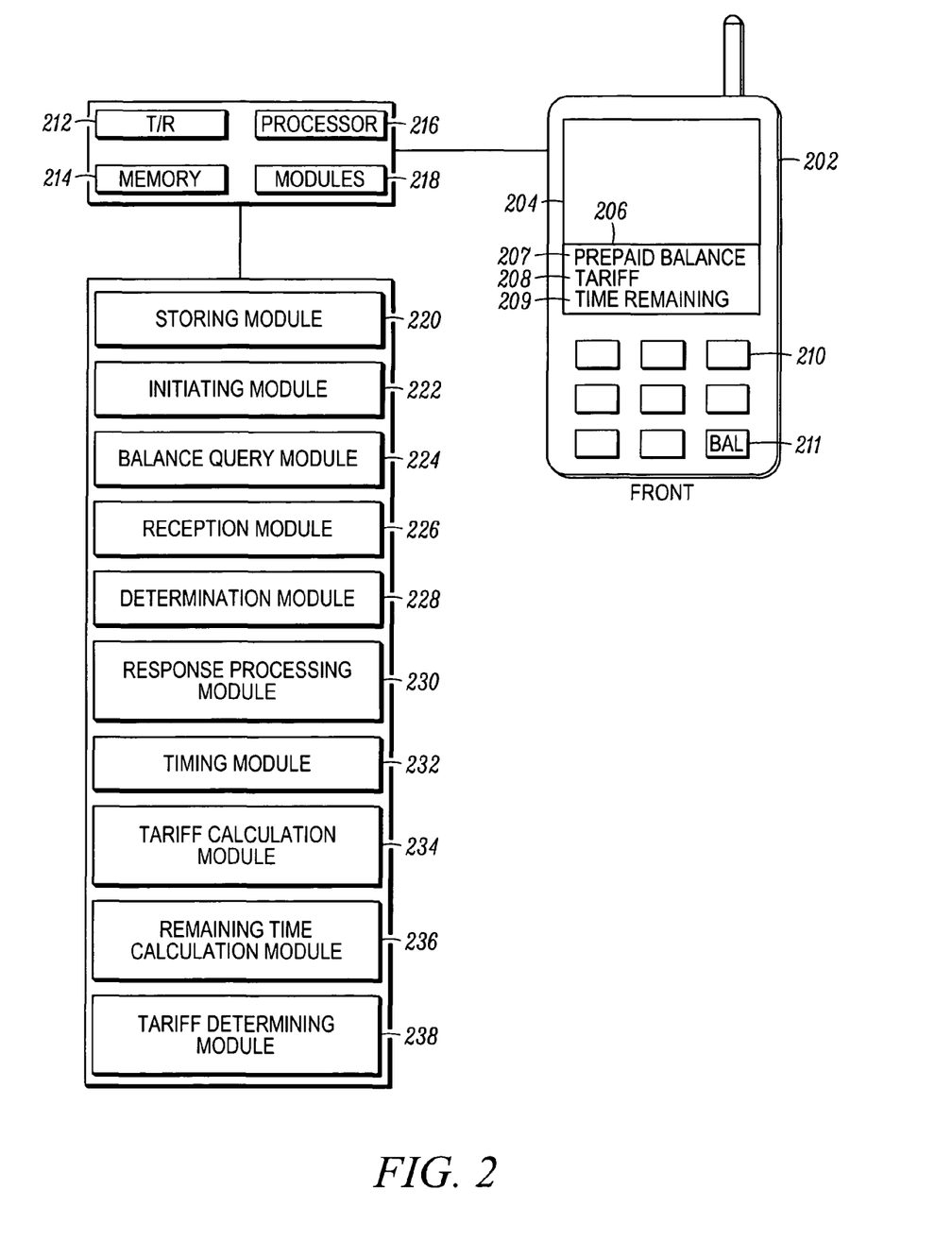
FIG. 2 is a block diagram illustrating certain components of a mobile communication device.

FIG. 2 is a block diagram illustrating certain components of a handset. The mobile communication device 202 can include an annunciation device such as display device 204. The display device 204 can include a dedicated display area 206 for displaying indicia of at least one of a prepaid balance 207, a tariff value 208 and a remaining time available value 209.

One or more of the display values 207, 208 and 209 may be updated continuously, incrementally or randomly. The query process described above can be repeated during the active mode wireless communication so that the prepaid balance value can be updated. Accordingly, in one embodiment, the balance query may be sent to the prepay server, a valid response may be received by the communication device, and the received remaining prepaid balance may then be displayed on the device display 204.

As discussed above, in another embodiment, if a valid response is not received in response to the balance query, the mobile communication device instead can provide calculations to update the balance. A calculated value can be displayed on the display 204, and can be updated continuously, incrementally or randomly.

In yet another embodiment, a query can be made and a valid updated prepaid balance can be received which is then followed by one or more calculated prepaid balance values determined by the mobile communication device. That is, the mobile communication device can transmit, during the active mode wireless communication, at least one balance query to the prepay server. According to the above-described embodiment, a valid response can be received from the prepay server 104 (FIG. 1) so that received prepay balance value may be displayed. Thereafter, a query may not be sent, but instead a calculation for an updated prepaid balance may be performed by the mobile communication device, taking into account the previously received response to the balance query from the prepay server. The calculated value can then be displayed. A period of time may pass before another balance query is transmitted to the prepay server. The process just described can be repeated. In this way, by interposing the values received from the prepay server with calculated values, traffic to the prepay server may be limited and the user may perceive a continuously or incrementally adjusted prepay balance value on the display.

It is understood that any manner in which to display at least one of a prepaid balance, a tariff value and a remaining time available value, and other received and derived values in an area of a display 204 similar to that shown in FIG. 2 is within the scope of this discussion. In one embodiment, the display screen 204 may include a dedicated display area 206. Alternatively, a display separate from display 204 may include a dedicated area or an entirely separate display may be dedicated for displaying the indicia. For receiving information relating to a prepaid balance during an audio communication, it may be preferable to view the information on a display screen. However, one or more indicia values can be provided in an audible manner as well or in the alternative. For example, were a user engaged in a time intensive data download, an audible annunciation of the information may be preferable.

FIG. 2 illustrates other components of the mobile communication device. An input device such as a keypad 210 is shown. The above discussed balance query can be automatically initiated during an active mode wireless communication, or can be manually initiated during an active mode wireless communication such as a telephone call or a temporary block flow. A manual initiation of a balance query can include pressing a signal key 211, for example.

For communication with at least one network (see FIG. 1), the mobile communication device may include at least one transceiver 212 for wireless communication over a main channel and an auxiliary channel. The device may further include a memory 214 and a processor 216 that generally can operate in accordance with one or more modules 218, which can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation.

Particular modules are also shown in FIG. 2. The modules can carry out certain processes of the methods as described herein. The operations in accordance with the modules will be discussed in more detail below. Shown in FIG. 2 are storing module 220, initiating module 222, balance query module 224, reception module 226, determination module 228, response processing module 230, timing module 232, tariff calculation module 234, remaining time calculation module 236 and tariff determination module 238. It is understood that other modules are within the scope of this discussion.

As discussed above, the mobile communication device 202 can include a transceiver 212, a processor or controller 216 configured to control operations of the mobile communication device and coupled to the transceiver 212 and a plurality of modules 218. The storing module 220 mentioned above can be configured to store a stored prepaid balance in memory 214. A balance value received in response to a balance query may also be stored in memory 214. An active mode wireless communication such as a telephone call or a SMS communication can be initiated by the initiating module 222 that is configured to initiate a wireless communication to a telephone number, URL, or other communication destination. During the active mode wireless communication, the balance querying module 224 that can be configured to transmit a balance query to a service provider can send the query to the prepay server 104 (shown in FIG. 1).

The balance query and the response by the prepay server can be transmitted on an auxiliary channel of the main communication. During the active mode wireless communication, the mobile communication device can therefore receive a response to the query by a reception module 226 via the auxiliary channel. A determination module 228 can be configured to determine whether the response to the balance query is valid and a response processing module 230 can be configured to process the response to the balance query to obtain a new prepaid balance if the response is valid.

Figure 3:
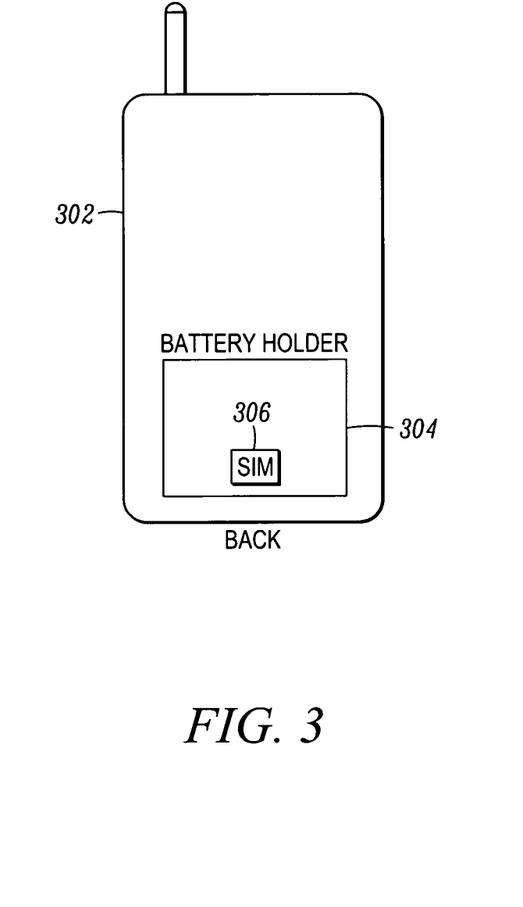
FIG. 3 illustrates the back side of a mobile communication device.

FIG. 3 illustrates a SIM card seen from the back side of a mobile communication device 302. The back side can include a battery holder 304. Often below a battery holder in a mobile communication device 302 is an easily accessed SIM card holder 306. The SIM card typically holds identification information for user validation and authentication purposes.

As mentioned above the query and response can be sent over a different or auxiliary channel of the communication. A query can be sent, for example, over a Universal Supplementary Services Data (USSD) channel or an SMS channel while the mobile communication device is engaged in active mode wireless communication. Other channels may be available over which to transmit a balance query and a response while a communication of the mobile communication device is in progress. To process the balance information value received from the prepay server, an embedded application may be configured in the mobile communication device, the installed SIM, or another suitable processing component or components. Balance information may be requested and extracted from the response in the same, similar or different formats to that of the query.

A final balance query may be requested at the end of an active mode wireless communication session so that the idle mode balance is known. Alternatively or additionally, in idle mode, to update a stored prepaid balance, periodic or random balance queries may be sent by the mobile communication device to the prepay server for balance updates. Fees may be attached to the prepaid balance apart from those charged during active mode wireless communication and therefore it may be beneficial to the user that a prepaid balance can be updated before the device initiates wireless communication. Also, as will be discussed below, since a calculation of the prepaid balance may use the stored prepaid balance, it may be beneficial that the stored prepaid balance be substantially current. An updated prepaid balance may be transmitted to the device at the end or start of an active mode wireless communication session, while the device is in idle mode, in response to a query, by push technology, or by manual input.

Figure 4:
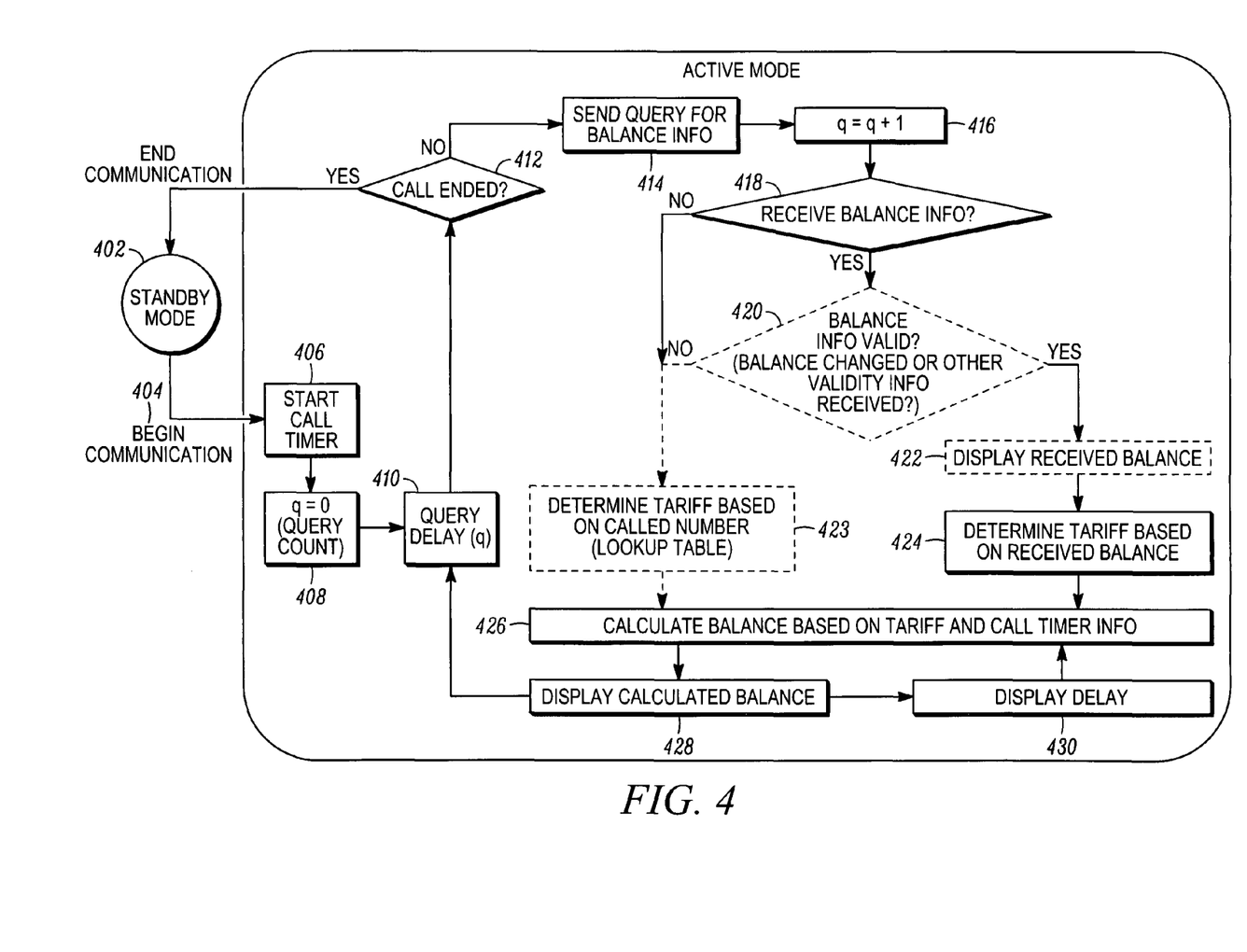
FIG. 4 is a flow chart of incorporating several embodiments of methods described herein.

FIG. 4 is a flow chart incorporating several method embodiments. As discussed, in standby or idle mode 402, there may be a stored prepaid balance stored in memory prior to initiating an active mode wireless communication via a service provider. When the active mode wireless communication begins 404, a call timer may be started 406. By starting a call timer when initiating the active mode wireless communication, a duration value can be generated. The duration value can be used, as discussed above, in calculating a tariff value based upon a difference between the new prepaid balance and the stored prepaid balance and upon the duration value.

The prepay server may charge a fee for one or more queries during active mode wireless communication. Accordingly, a user may wish to limit the query count. Therefore, a query count can be initiated 408. Similarly, if the user knows that the call will be short, the user may wish to avoid a query, particularly if there is an associated fee. In that case there may be a query delay 410. If the call has ended 412, then the mobile communication device can return to standby mode 402. Otherwise, if the call has not ended, the first or next query can be sent to the prepay server 414. The query count can be incremented 416.

Modules of the mobile communication device can provide instructions to the processor to process a response from the prepay server 418. For example, a reception module (see 226, FIG. 2) can be configured to receive, during the active mode wireless communication, a response to the balance query. A determination module (see 228, FIG. 2) can be configured to determine whether the response to the balance query is valid 420. A response processing module (see 230, FIG. 2) can be configured to process the response to the balance query to obtain a new prepaid balance if the response is valid. The received prepaid value may be annunciated, for example, by displaying it on the display device of the mobile communication device 422.

In the event that a response to the balance query is not received, or that the response is invalid 420, a tariff determining module (see 234, FIG. 2) can be configured to calculate a tariff value based on the called telephone number and a rule set 423. The rule set may be for example a look-up table. Since the timing module referred to in step 406 can be configured to start a call timer to generate a duration value, a tariff value can be derived from a tariff calculation 424 based upon the difference between the new prepaid balance and the stored prepaid balance and upon the duration value. The calculated tariff value may also be displayed 428. Since there generally may be a need to minimize balance queries and other network traffic, the display generally can be updated at a higher rate than the query. Hence, even after valid balance info is received 418 and validated 420 the balance may be continually updated based call the tariff and call timer info 426, with a rate or recalculation 426 and display 428 determined by the display delay 430. The response to the balance inquiry may be invalid, for example, if the balance field is missing or includes a null field such as a field containing only binary zeros or ones, or if the balance is substantially different from a calculated balance, for example if the received balance is unchanged from the previously received balance or initial balance.

It may be beneficial to the user to know the remaining time based upon the tariff value in addition to knowing the prepaid balance. A remaining time calculation module (see 236, FIG. 2) can be configured to calculate a remaining time available value for the wireless communication based on the stored prepaid balance, the tariff value and the duration value. The remaining time available value can be displayed on the display.

In FIG. 4, the processes shown may be repeated. For example, repeated queries can be made such that q=q+1 in step 416. The number of queries made during a communication can be dependent upon several factors. For example, the amount of traffic to the prepay server may limit the number queries made according to the query count 408. The number of queries made also can be determined by a query rate proportional to the reciprocal of the query delay 410. The number of query attempts may be determined by the mobile communication device, while the number of responses may be determined by the prepay server. Other factors relating to the number of queries made may also be considered. For example, as mentioned above, queries may be limited due to charges by the prepay server for queries. To compensate for fewer queries, the method of calculating the remaining prepaid balance may also be used between responses to queries even when there is a valid response to one or more queries. The calculated balance may be used to update the display, giving the user the perception that the value is being updated continuously.

Figure 5:
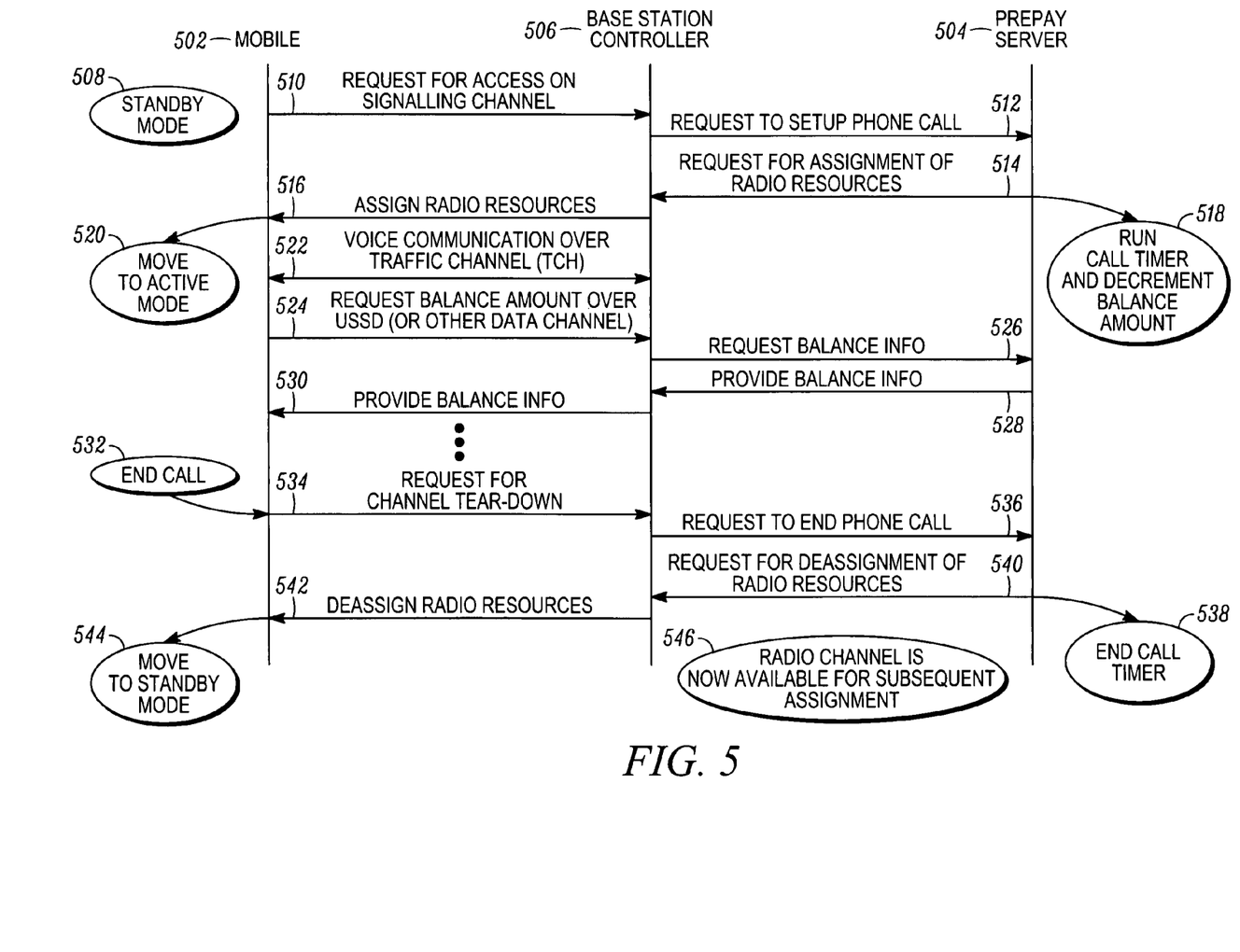
FIG. 5 is a signal flow diagram including a mobile communication device, a prepay server and a base station controller.

FIG. 5 is a signal flow diagram including a mobile communication device 502, a prepay server 504 and a base station controller 506. Initially, a mobile communication device can be in idle or standby mode 508. As mentioned above, at this time, a stored prepaid balance can be stored in the memory of the mobile communication device. To initiate an active mode wireless communication of any type, such as a call or a temporary flow block, a request for access on a signaling channel can be made to the base station controller. A request can be made to set up an active mode wireless communication 512 to the prepay server 504.

A request for assignment of radio services can be made 514 by the prepay server 504 to the base station controller 506. The assignment can be made by the base station controller to the mobile communication device 516. A call timer by the prepay server 518 may have been initiated so that the communication of the mobile communication device can be initiated 520. For example, communication can include voice traffic over a traffic channel (TCH) or SMS traffic over an SMS channel 522. It is understood that any type of communication, suitable channels for communication and balance query and response communication are within the scope of this discussion.

As discussed above, during the active mode wireless communication, the balance query can be made over USSD or other data channel 524 that provides an auxiliary channel to the communication channel. The base station controller can pass the query onto the prepay server 526 that may monitor the account run call time and decrement balance amount 518. The prepay station may accordingly provide a balance response 528 that is passed along to the mobile communication device by the base station controller 530.

The call may end 532 so that the mobile communication device can request a tear-down 534 of the communication channel 522. The request is passed along to the prepay server 536. The prepay server can end the call timer 538 and make a request that the radio resources are unassigned 540 that is passed onto the base station controller. The radio resources are unassigned 542 and the mobile communication device can move into standby or idle mode 544. The radio channel can be available for subsequent assignment 546.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. A method of a mobile communication device, comprising:
   storing in memory a stored prepaid balance prior to initiating a wireless communication via a service provider;
   initiating a wireless communication so that the device is in active mode;
   starting a call timer when initiating the wireless communication to generate a duration value;
   transmitting, during active mode wireless communication, at least one balance query to the service provider;
   receiving, during active mode wireless communication, a response to the balance query;
   processing the response to the balance query to obtain a new prepaid balance; and
   calculating a tariff value at the mobile communication device based upon a difference between the new prepaid balance and the stored prepaid balance and upon the duration value.

2. The method of claim 1, further comprising:
   determining if the response to the balance query is valid; and
   processing the response to the balance query to obtain a new prepaid balance includes processing the response to the balance query to obtain the new prepaid balance if the response to the balance query is valid.

3. The method of claim 2, wherein a new duration value can be measured during the active mode wireless communication, the method further comprising:
   calculating an updated prepaid balance value based on the new duration value, the tariff value and the new prepaid balance from the response to the balance query.

4. The method of claim 1, further comprising:
   displaying indicia of at least one of a new prepaid balance, an updated prepaid balance, a tariff value and a remaining time available value on a dedicated display area of the mobile communication device.

5. The method of claim 1, wherein active mode wireless communication is at least one of a voice call and a temporary block flow.

6. The method of claim 1, further comprising:
   displaying indicia of at least one of a calculated prepaid balance, a tariff value and a remaining time available value on a dedicated display area of the mobile communication device.

7. A mobile communication device, comprising:
a transceiver;
a controller configured to control operations of the mobile communication device and coupled to the transceiver and a plurality of modules;
a storing module configured to store in memory a stored prepaid balance;
an initiating module configured to initiate a wireless communication so that the device will enter active mode;
a querying module configured to transmit, during the active mode wireless communication, a balance query to a service provider;
a reception module configured to receive, during the active mode wireless communication, a response to the balance query;
a response processing module configured to process the response to the balance query to obtain a new prepaid balance;
a timing module configured to start a call timer to generate a duration value; and
a tariff calculation module configured to calculate a tariff value based upon the difference between the new prepaid balance and the stored prepaid balance and upon the duration value.

8. The device of claim 7, further comprising:
a determination module configured to determine whether the response to the balance query is valid,
wherein the response processing module is configured to process the response to the balance query to obtain the new prepaid balance if the response is valid.

9. The device of claim 8, further comprising:
a remaining time calculation module configured to calculate a remaining time value based on the new prepaid balance and the tariff value.

10. The device of claim 7, further comprising:
a dedicated display area for displaying indicia of at least one of a prepaid balance, a tariff value and a remaining time available value.

* * * * *